US009318886B1

(12) United States Patent
Pate

(10) Patent No.: US 9,318,886 B1
(45) Date of Patent: Apr. 19, 2016

(54) ELECTRICAL FIXTURE MOUNTING SYSTEM

(71) Applicant: Alford Roney Pate, Glen Allen, VA (US)

(72) Inventor: Alford Roney Pate, Glen Allen, VA (US)

( * ) Notice: Subject to any disclaimer, the term of this patent is extended or adjusted under 35 U.S.C. 154(b) by 62 days.

(21) Appl. No.: 14/332,033

(22) Filed: Jul. 15, 2014

(51) Int. Cl.
*H01R 11/30* (2006.01)
*H02G 3/08* (2006.01)
*H01R 13/62* (2006.01)

(52) U.S. Cl.
CPC ................. *H02G 3/08* (2013.01); *H01R 11/30* (2013.01); *H01R 13/6205* (2013.01)

(58) Field of Classification Search
CPC ....... H01R 11/30; H01R 13/6205; H02G 3/08
USPC ...................................................... 439/38–40
See application file for complete search history.

(56) References Cited

U.S. PATENT DOCUMENTS

| | | | |
|---|---|---|---|
| 3,706,882 | A | 12/1972 | Eby |
| 4,156,265 | A | 5/1979 | Rose |
| 4,318,159 | A | 3/1982 | Kaisner |
| 4,449,168 | A | 5/1984 | Ewing |
| 6,322,232 | B1 | 11/2001 | Oliver |
| 6,923,551 | B2 | 8/2005 | Galli |
| 7,726,974 | B2 | 6/2010 | Shah |
| 7,789,526 | B2 | 9/2010 | Gibbons |
| 8,454,204 | B1 | 6/2013 | Chang |
| 2007/0183138 | A1 | 8/2007 | Cooper |

*Primary Examiner* — Khiem Nguyen
(74) *Attorney, Agent, or Firm* — Neustel Law Offices; Jason L. Gilbert

(57) ABSTRACT

A light fixture mounting system which aids in quickly, easily, and safely connecting a light fixture to a junction box. The light fixture mounting system generally includes a mounting plate adapted to be electrically and mechanically connected to a junction box. The mounting plate includes contacts comprised of metallic material such that an electrical fixture may be magnetically secured to the mounting plate. Magnets on the electrical fixture will magnetically engage with the contacts to magnetically secure the electrical fixture to the mounting plate. Current from the junction box will pass through the contacts and magnets to power the light source. A relay switch and reed switch are also utilized in combination with a central magnet on the electrical fixture to stop current flow if the electrical fixture becomes partially or fully dislodged from the mounting plate.

20 Claims, 10 Drawing Sheets

ELECTRICAL FIXTURE MOUNTING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to an electrical fixture mount and more specifically it relates to an electrical fixture mounting system which aids in quickly, easily, and safely connecting an electrical fixture to a junction box.

2. Description of the Related Art

Any discussion of the related art throughout the specification should in no way be considered as an admission that such related art is widely known or forms part of common general knowledge in the field.

Light fixtures are almost universally utilized within just about every room in most buildings throughout the world. Junction boxes are universally utilized as mounting points for light fixtures. Conventionally, a cross bar mount is first installed to the junction box. The light fixture is then hard-wired to the junction box connections by connecting wires from the light fixture to wires from the junction box. The light fixture is then attached to the junction box cross bar using bolts and then covered by a decorative cap.

This method, while reliable, is comparatively slow and difficult. An experienced person can install a new fixture in about 10-15 minutes and change an existing fixture in about 20 minutes. While this may not seem too time-intensive, a new and unique method and system has been formulated which significantly decreases the time required to install such a light fixture to a junction box. Additionally, many homeowners are intimidated by the idea of working with electrical connections and would prefer a simpler method for installing or changing out light fixtures.

Because of the inherent problems with the related art, there is a need for a new and improved light fixture mounting system which aids in quickly, easily, and safely connecting a light fixture to a junction box.

BRIEF SUMMARY OF THE INVENTION

The invention generally relates to an electrical fixture mount which includes a mounting plate adapted to be electrically and mechanically connected to a junction box. The mounting plate includes contacts comprised of metallic material such that an electrical fixture may be magnetically secured to the mounting plate. Magnets on the electrical fixture will magnetically engage with the contacts to magnetically secure the electrical fixture to the mounting plate. Current from the junction box will pass through the contacts and magnets to power the light source. A relay switch and reed switch are also utilized in combination with a central magnet on the electrical fixture to stop current flow if the electrical fixture becomes partially or fully dislodged from the mounting plate.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
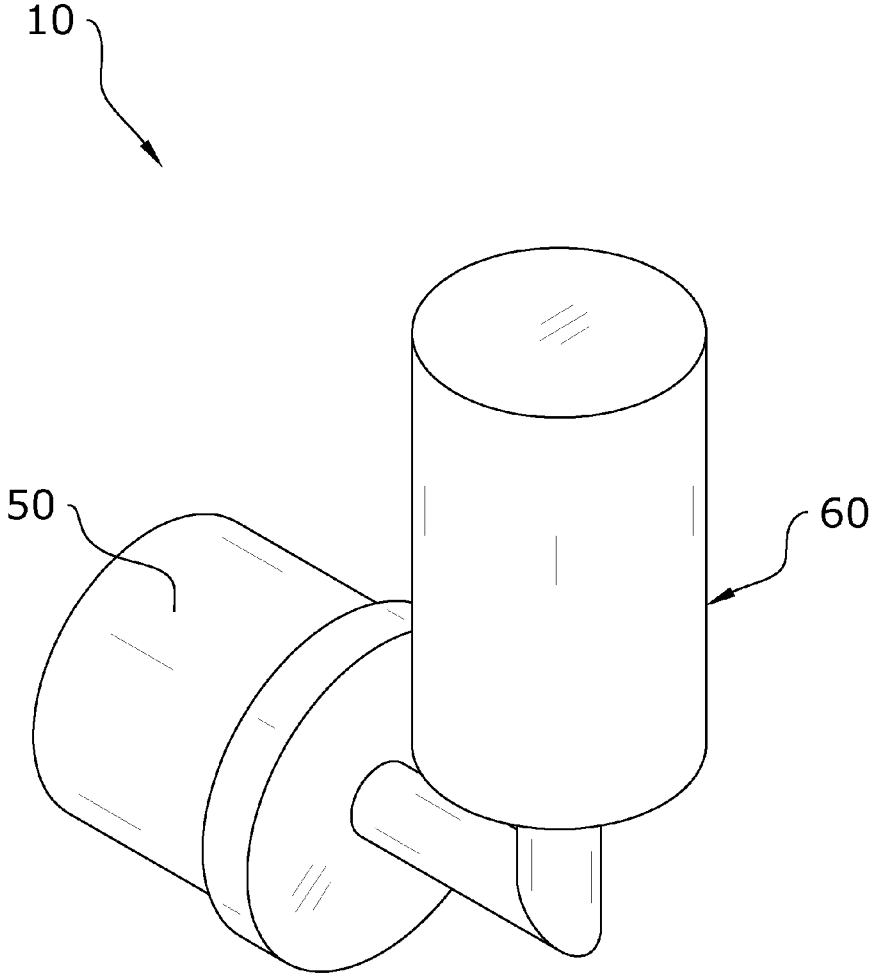
FIG. 1 is an upper perspective view of a light fixture used with the present invention.

A. Overview.

Turning now descriptively to the drawings, in which similar reference characters denote similar elements throughout the several views, FIGS. 1 through 11 illustrate a light fixture mounting system 10, which comprises a mounting plate 20 adapted to be electrically and mechanically connected to a junction box 50. The mounting plate 20 includes contacts 23, 25, 27 comprised of metallic material such that a light fixture 60 may be magnetically secured to the mounting plate 20. Magnets 63, 65, 67 on the light fixture 60 will magnetically engage with the contacts 23, 25, 27 to magnetically secure the light fixture 60 to the mounting plate 20. Current from the junction box 50 will pass through the contacts 23, 25, 27 and magnets 63, 65, 67 to power the light source. A relay switch 30 and reed switch 40 are also utilized in combination with a central magnet 68 on the light fixture 60 to stop current flow if the light fixture 60 becomes partially or fully dislodged from the mounting plate 20.

B. Mounting Plate.

Figure 4:
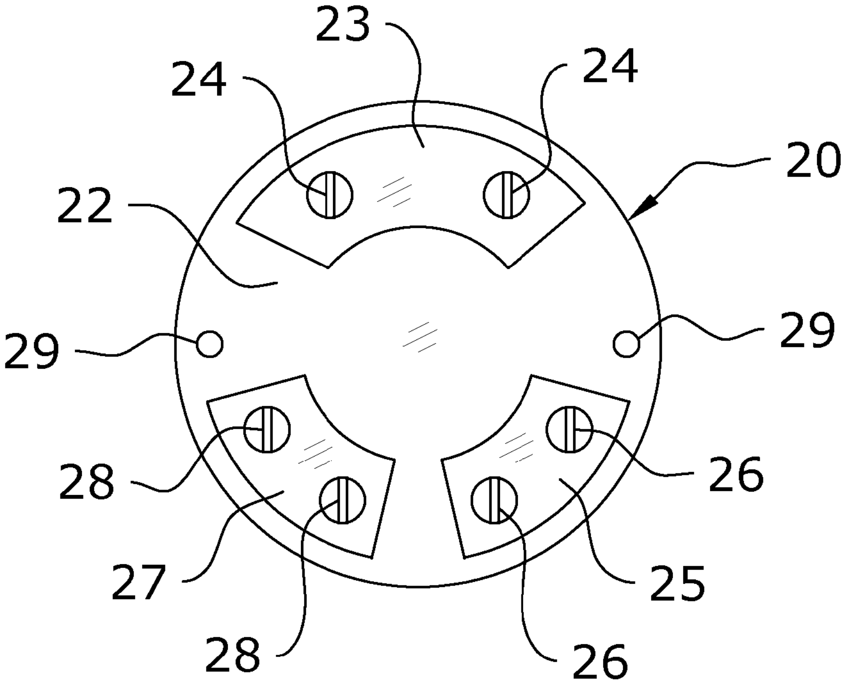
FIG. 4 is a bottom view of the mounting plate of the present invention.
Figure 5:
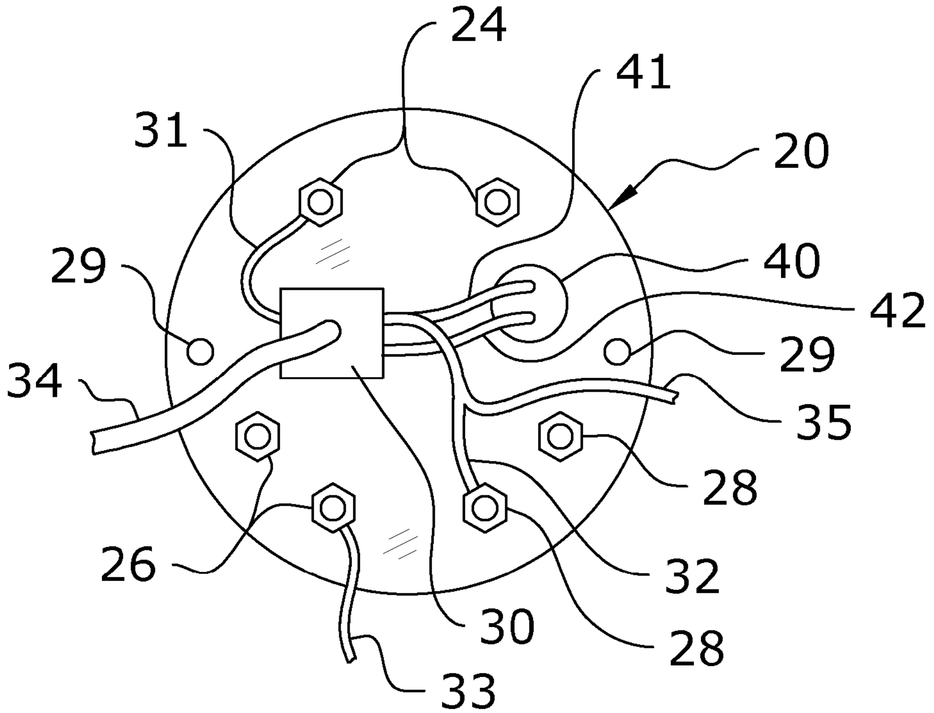
FIG. 5 is a top view of the mounting plate of the present invention.
Figure 6:
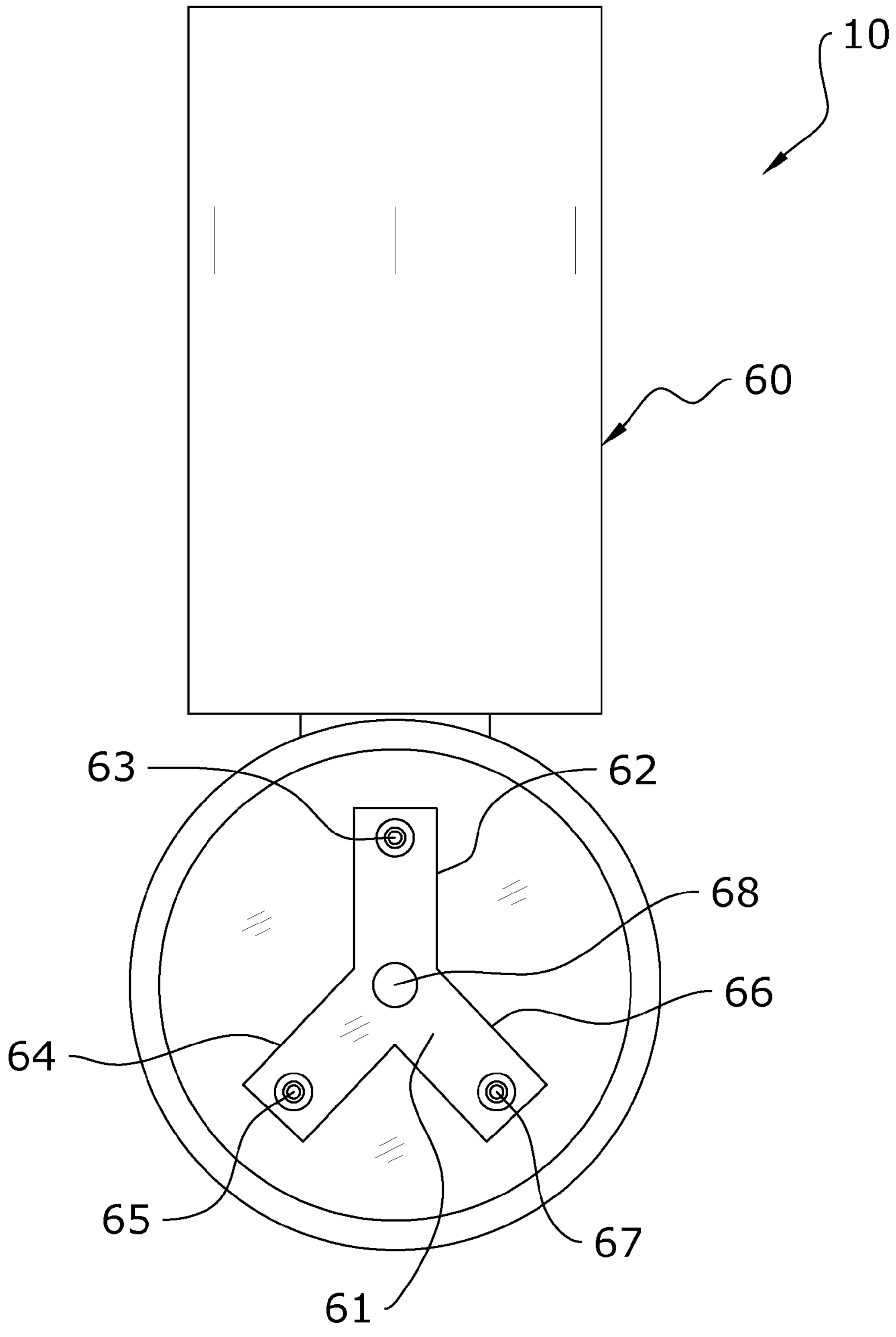
FIG. 6 is a bottom view of a light fixture of the present invention.

As best shown in FIGS. 4 and 5, the present invention includes a mounting plate 20 which is connected and mounted to a junction box 50. The light fixture 60 of the present invention is mounted to the mounting plate 20, with the mounting plate 20 interconnecting with a corresponding connector panel 61 on the light fixture 60 to pass power from the junction box 50 to the light fixture 60.

Figure 2:
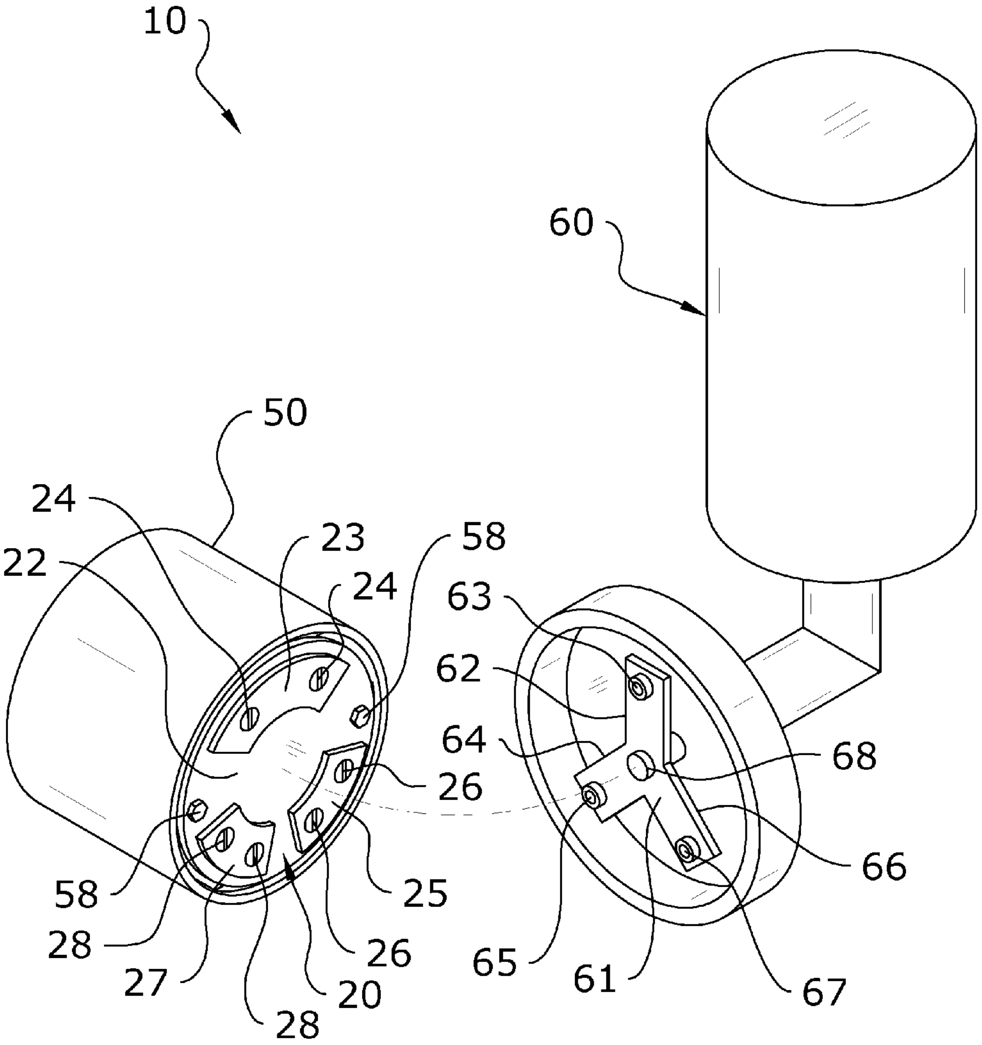
FIG. 2 is an upper perspective view of a light fixture with the mounting plate and connector panel exposed.

The mounting plate 20 may comprise various shapes, sizes, and configurations. Thus, the shape, size, and configuration of the mounting plate 20 should not be construed as limited by the exemplary figures. In a preferred embodiment as shown in the figures, the mounting plate 20 comprises a circular shape having an upper surface 21 and a lower surface 22. The upper surface 21 of the mounting plate 20 faces the junction box 50 and the lower surface 22 of the mounting plate 20 faces the light fixture 60 when the present invention is assembled and installed as shown in FIGS. 1 and 2.

As best shown in FIG. 4, the lower surface 22 of the mounting plate 20 includes a plurality of contacts 23, 25, 27 which are adapted to interconnect with the connector panel 61 of the light fixture 60 to pass power from the junction box 50 to the light fixture 60. Each of the contacts 23, 25, 27 generally comprises a conductive material which is secured to the non-conductive lower surface 22 of the mounting plate 20 so that the contacts 23, 25, 27 do not interconnect with each other. Various conductive materials may be utilized, such as ferrous metals.

The contacts 23, 25, 27 will each be configured for different uses. The positive contact 23 is adapted to be electrically connected to a positive source 55 from the junction box 50. The neutral contact 25 is adapted to be electrically connected to a neutral source 56 from the junction box 50. The ground contact 27 is adapted to be connected to the ground source 57 from the junction box 50.

The shape, size, and configuration of the contacts 23, 25, 27 may vary in different embodiments. In a preferred embodiment as shown in the figures, each of the contacts 23, 25, 27 comprises a curved plate which is secured to the lower surface 22 of the mounting plate 20.

Attachment members 24, 26, 28 secure the contacts 23, 25, 26 to the lower surface 22 of the mounting plate 20 as shown in FIG. 4. Additionally, the attachment members 24, 26, 28 act as connection points for connectors 31, 32 of the present invention. As shown in the figures, the positive contact 23 includes one or more positive attachment members 24, the neutral contact 25 includes one or more neutral attachment members 26, and the ground contact 27 includes one or more ground attachment members 28. The configuration of the attachment members 24, 26, 28 may vary, with a preferred embodiment utilizing conductive bolts or the like.

As shown throughout the figures, the mounting plate 20 may also include one or more mounting apertures 29 for securing the mounting plate 20 to the junction box 50, such as through the use of fasteners 58. The mounting apertures 29 may be placed in different locations to suit different types of junction boxes 50. The numbering, orientation, and placement of the mounting apertures 29 may vary in different embodiments and should not be construed as limited by the exemplary figures.

The upper surface 21 of the mounting plate 20 includes electrical components to be interconnected with sources 55, 56, 57 from the junction box 50. A relay switch 30 is provided to transmit the current from the junction box to the positive and neutral contacts 23, 25 of the mounting plate 20. Any type of relay switch 30 known in the art may be utilized for this functionality.

A reed switch 40 may also be provided to control flow of current to the relay switch 30. Any type of reed switch 40 known in the art may be utilized. The reed switch 40 will close the relay switch 30 when a central magnet 68 on the light fixture 60 is detected; indicating that the mounting plate 20 and light fixture 60 are connected to each other. When the central magnet 68 is not present, indicating partial or full disconnection of the mounting plate 20 from the junction box 50, the relay switch 30 will be opened and the current flow to the relay switch 30 and contacts 23, 25 will be stopped.

As best shown in FIG. 5, a positive relay connector 31 will be electrically connected between a positive attachment member 24 and the relay switch 30. Similarly, a neutral relay connector 32 will be electrically connected between a neutral attachment member 26 and the relay switch 30. A positive reed connector 41 and a neutral reed connector 42 will be electrically connected between the relay switch 30 and the reed switch 40.

FIG. 5 also illustrates connectors 33, 34, 35 which extend from the upper surface 21 of the mounting plate 20 to be interconnected with sources 55, 56, 57 from the junction box 50. A ground connector 33 is electrically connected to a ground attachment member 28 and extends therefrom. A current source connector 34 is electrically connected and extends from the relay switch 30 so that incoming current from the junction box 50 may be controlled. A neutral connector 35 is electrically connected to and extends in-line from the neutral relay connector 32.

Each of the connectors 31, 32, 33, 34, 35, 41, 42 may be comprised of various conductive devices or materials. In a preferred embodiment, each of the connectors 31, 32, 33, 34, 35, 41, 42 comprises an electrical conduit, such as a wire having a conductive core surrounded by insulation. Quick connectors 59 may be provided on the ends of the connectors 33, 34, 35 which are to be interconnected with corresponding sources 55, 56, 57.

C. Junction Box.

The present invention is adapted for use with a junction box 50, which provides the sources 55, 56, 57 of electrical current and grounding to which the mounting plate 20 is connected. Each of the sources 55, 56, 57 generally comprise conduits which are linked with an electrical panel, generally in or around the same building, which provides power throughout the building.

Figure 3:
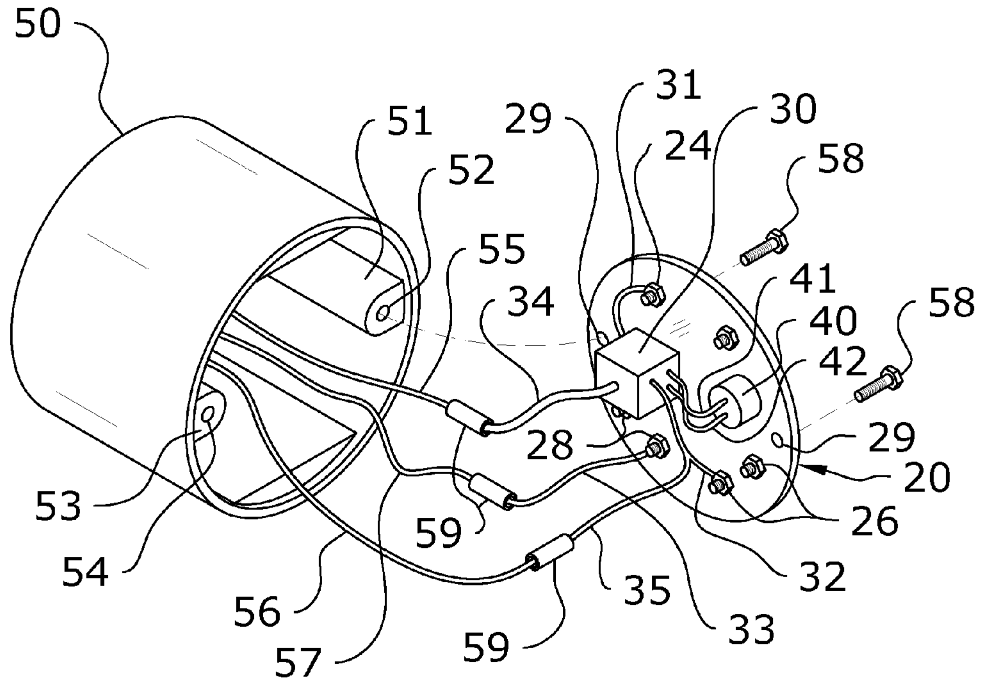
FIG. 3 is an upper perspective view illustrating interconnection between a junction box and the mounting plate.

A conventional junction box 50 is illustrated in FIG. 3. As shown therein, the junction box 50 generally comprises a round or rectangular housing which is positioned within an enclosure, such as within a wall or ceiling of a building. The junction box 50 generally includes a first mount 51 with a first mount aperture 52 and a second mount 53 with a second mount aperture 54. The first and second mount apertures 52, 54 are aligned with the mounting apertures 29 of the mounting plate 20 and one or more fasteners 58 may be utilized to mechanically connect the mounting plate 20 to the junction box 50.

As shown in FIG. 3, the sources 55, 56, 57 of the present invention will extend through and out of the junction box 50. A positive source 55 extends from the junction box 50 which is interconnected with the current source connector 34 of the mounting plate 20, such as via a quick connector 59. A neutral source 56 extends from the junction box 50 which is interconnected with the neutral connector 35 of the mounting plate 20, such as via a quick connector 59. A ground source 57 extends from the junction box 50 which is interconnected with the ground connector 33, such as via a quick connector 59.

D. Electrical Fixture.

Figure 7:
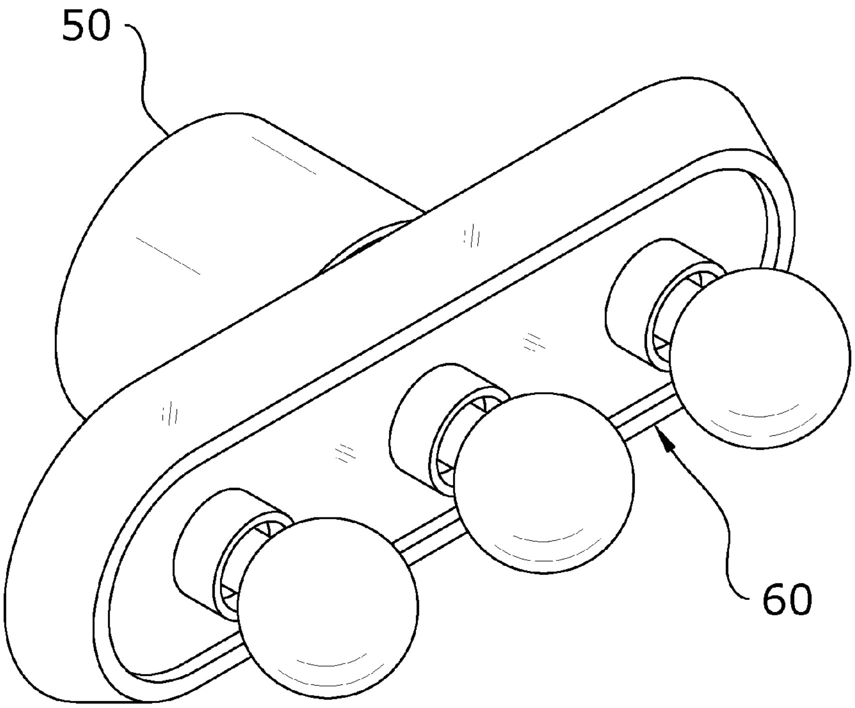
FIG. 7 is an upper perspective view of an alternate light fixture used with the present invention.
Figure 8:
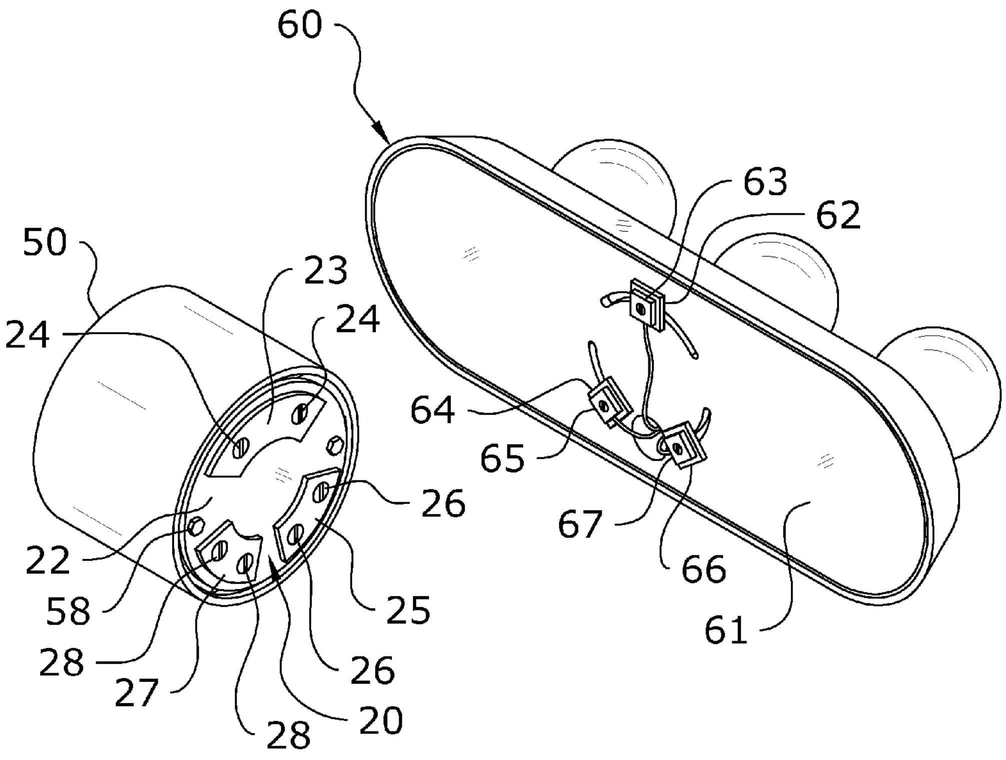
FIG. 8 is an upper perspective view of the alternate light fixture with the mounting plate and connector panel exposed.
Figure 9:
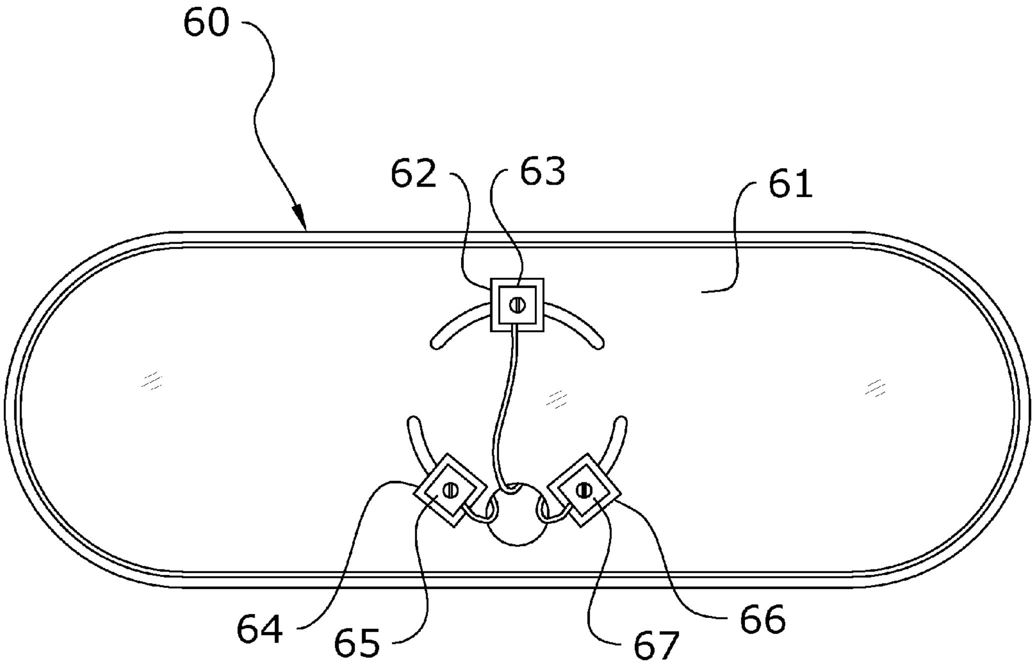
FIG. 9 is a bottom view of the alternate light fixture.

The term "light fixture" should be construed as including additional electrical fixtures. It should thus be appreciated that the present invention is adapted for use with a wide range of electrical fixtures 60 covering a range of electrical devices, including the light fixtures 60 shown in the figures. A first light fixture 60 design is shown in FIGS. 1-6 and a second light fixture 60 design is shown in FIGS. 7-9.

Figure 10:
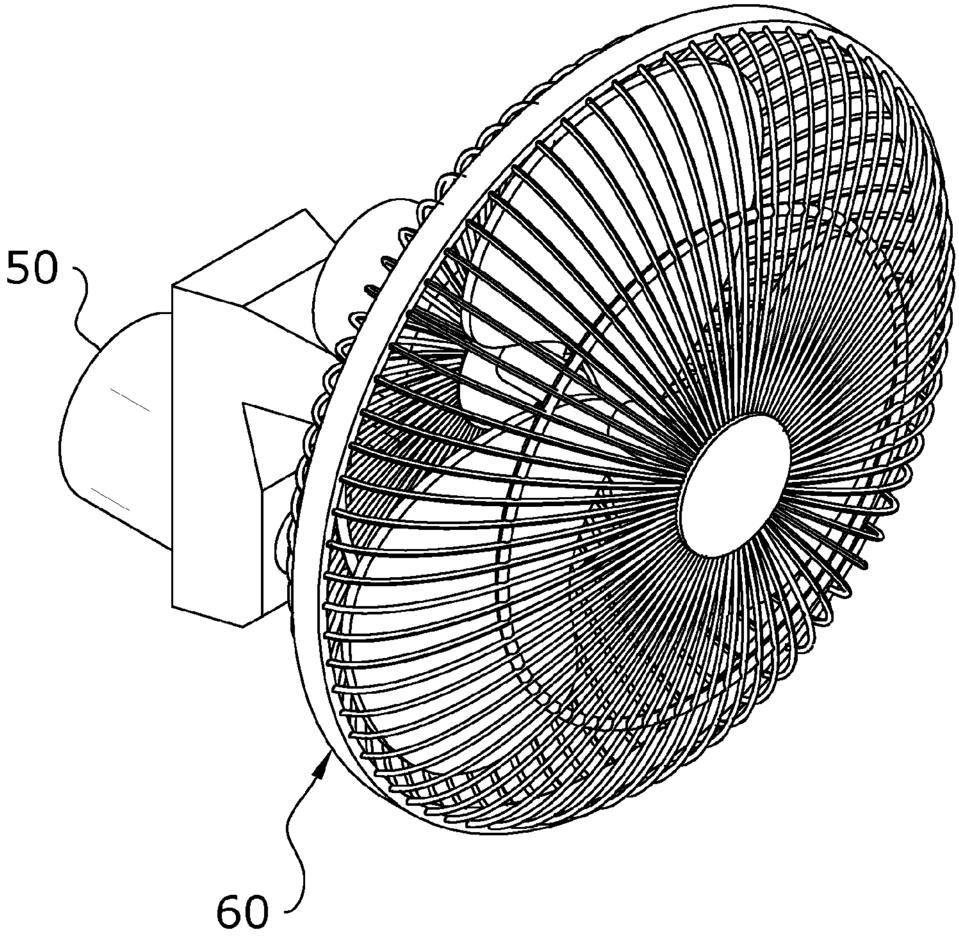
FIG. 10 is an upper perspective view of the present invention in use with a mounted fan.
Figure 11:
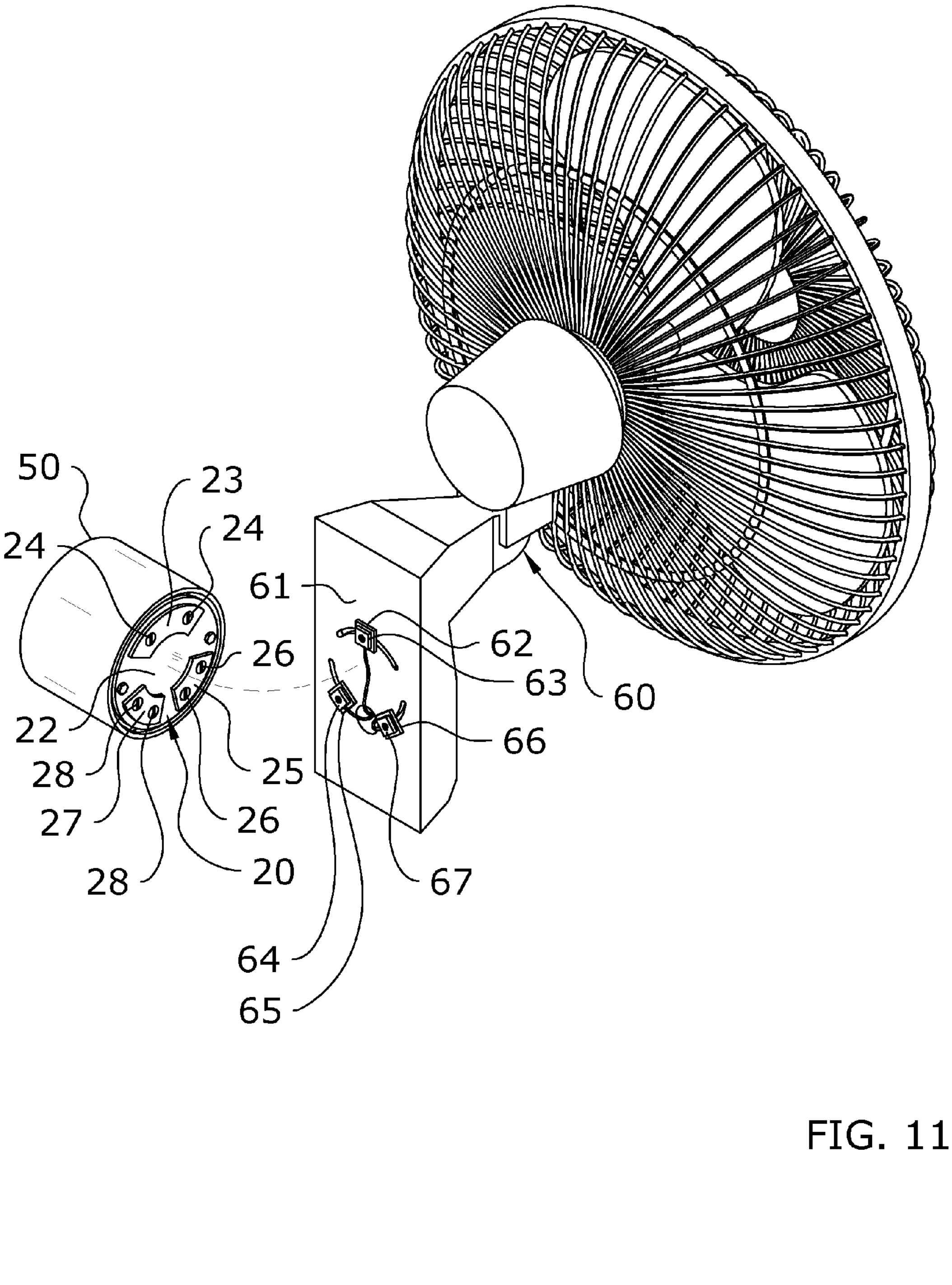
FIG. 11 is an upper perspective exploded view of the present invention in use with a mounted fan.

The scope of the present invention should not be limited by these exemplary figures. Any type of electrical fixture 60 which is adapted for connection to a junction box 50 may be utilized with the present invention. FIGS. 10 and 11 show the present invention being used in combination with an electrical fixture 60 comprised of a mounted fan.

The light fixture 60 will generally include a connector panel 61 to which the mounting plate 20 will be magnetically connected to electrically connect the sources 55, 56, 57 with the light fixture 60. Generally, the connector panel 61 will include a first magnet 63 for connecting to the positive contact 23 of the mounting plate 20, a second magnet 65 for connecting to the neutral contact 25 of the mounting plate 20, and a third magnet 67 for connecting to the ground contact 27 of the mounting plate 20. These magnets 63, 65, 67 will magnetically engage with the contacts 23, 25, 27 to easily secure the light fixture 60 to the mounting plate 20.

Electrical leads are connected between the magnets 63, 65, 67 and the light source within the light fixture 60. As shown in FIG. 9, a positive lead will connect the first magnet 63 with the positive connection for the light source, a neutral lead will connect the second magnet 65 with the neutral connection for the light source, and a ground lead will connect the third magnet 67 with the ground connection for the light source.

A central magnet 68 is provided in an area of the connector panel 61 which will allow the central magnet 68 to be directly in line with the reed switch 40 of the present invention. The central magnet 68 is not connected to any current source. The relay switch 30 will be closed when the reed switch 40 detects presence of the central magnet 68, and opened when the reed switch 40 does not detect presence of the central magnet 68. This will prevent current flow unless the light fixture 60 is fully mounted to the mounting plate 20.

The structure, shape, orientation, and size of the connector panel 61 may vary in different embodiments. As shown in FIG. 9, a separate panel may be omitted, with the magnets 63, 65, 67, 68 simply being connected to the underside of the light fixture 60. In a preferred embodiment shown in FIG. 6, the connector panel 61 will comprise a Y-shaped insulation material having a first arm 62, a second arm 64, and a third arm 66 all extending outwardly in different directions from the central magnet 68. The first magnet 63 is positioned on the distal end of the first arm 62, the second magnet 65 is positioned on the distal end of the second arm 64, and the third magnet 67 is positioned on the distal end of the third arm 66.

E. Operation of Preferred Embodiment.

In use, the mounting plate 20 is first both electrically and mechanically connected to the junction box 50 as shown in FIGS. 1 and 3. The ground connector 33 of the mounting plate 20 is connected via a quick connector 59 to the ground source 57 of the junction box 50. The current source connector 34 of the mounting plate 20 is connected via a quick connector 59 to the positive source 55 of the junction box 50. The neutral connector 35 of the mounting plate 20 is connected via a quick connector 59 to the neutral source 56 of the junction box 50. With the electrical connections established, the mounting plate 20 is attached to the junction box 50 using the mounting apertures 29 of the mounting plate 20 and the mounts 51, 53 of the junction box 50, along with fasteners 58.

With the mounting plate 20 in place, the light fixture 60 may be attached and activated. The contacts 23, 25, 27 of the mounting plate 20 are aligned and magnetically engaged with the corresponding magnets 63, 65, 67 of the light fixture 60. When the central magnet 68 is detected by the reed switch 40, current will flow and the light fixture 60 may be operated as normal.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An electrical fixture mounting system, comprising:

a mounting plate, wherein said mounting plate includes a plurality of contacts;

a junction box, wherein said junction box includes a plurality of sources, wherein said sources are electrically interconnected with said contacts; and an electrical fixture, wherein said electrical fixture includes a plurality of magnets for magnetically engaging with said plurality of contacts to electrically and mechanically connect said electrical fixture with said mounting plate.

2. The electrical fixture mounting system of claim 1, wherein said plurality of contacts comprises a positive contact, a neutral contact, and a ground contact.

3. The electrical fixture mounting system of claim 2, wherein each of said plurality of contacts comprises a conductive plate positioned on a lower surface of said mounting plate.

4. The electrical fixture mounting system of claim 3, wherein said plurality of sources comprises a positive source, a neutral source, and a ground source.

5. The electrical fixture mounting system of claim 4, wherein said positive source is electrically interconnected with said positive contact, said neutral source is electrically interconnected with said neutral contact, and said ground source is electrically connected with said ground contact.

6. The electrical fixture mounting system of claim 5, wherein said plurality of magnets comprises a first magnet, a second magnet, and a third magnet.

7. The electrical fixture mounting system of claim 6, wherein said first magnet is adapted to connect to said positive contact, said second magnet is adapted to connect to said neutral contact, and said third magnet is adapted to connect to said ground contact.

8. The electrical fixture mounting system of claim 7, wherein said mounting plate includes a relay switch, wherein said positive contact and said neutral contact are each electrically connected through said relay switch.

9. The electrical fixture mounting system of claim 8, wherein said mounting plate includes a reed switch connected to said relay switch.

10. The electrical fixture mounting system of claim 9, wherein said reed switch is adapted to detect magnetism from a central magnet positioned on said electrical fixture when said electrical fixture is mounted to said mounting plate.

11. The electrical fixture mounting system of claim 1, wherein said electrical fixture is comprised of a light fixture.

12. The electrical fixture mounting system of claim 1, wherein said electrical fixture is comprised of a mounted fan device.

13. A electrical fixture mounting system, comprising:

a mounting plate, wherein said mounting plate includes a positive contact, a negative contact, and a ground contact;

a junction box, wherein said junction box includes a plurality of sources, wherein said sources are electrically interconnected with said contacts; and an electrical fixture, wherein said electrical fixture includes a plurality of magnets for magnetically engaging with said contacts to electrically and mechanically connect said electrical fixture with said mounting plate, wherein said plurality of magnets comprises a first magnet adapted to engage with said positive contact, a second magnet adapted to engage with said negative contact, and a third magnet adapted to engage with said ground contact.

14. The electrical fixture mounting system of claim 13, wherein said electrical fixture includes a connector panel, wherein said plurality of magnets are positioned on said connector panel.

15. The electrical fixture mounting system of claim 14, wherein said connector panel comprises a Y-shaped configuration.

16. The electrical fixture mounting system of claim 15, wherein said connector panel comprises a non-conductive material.

17. The electrical fixture mounting system of claim 16, wherein said connector panel includes a first arm, a second arm, and a third arm.

18. The electrical fixture mounting system of claim 17, further comprising a central magnet positioned at a central location of said connector panel.

19. The electrical fixture mounting system of claim 18, wherein said first magnet is positioned at a distal end of said first arm, said second magnet is positioned at a distal end of said second arm, and a third magnet is positioned at a distal end of said third arm.

20. The electrical fixture mounting system of claim 13, wherein said electrical fixture is comprised of a light fixture.

* * * * *